US009152483B2

(12) United States Patent
Michels et al.

(10) Patent No.: US 9,152,483 B2
(45) Date of Patent: Oct. 6, 2015

(54) NETWORK DEVICES WITH MULTIPLE FULLY ISOLATED AND INDEPENDENTLY RESETTABLE DIRECT MEMORY ACCESS CHANNELS AND METHODS THEREOF

(75) Inventors: Timothy Michels, Greenacres, WA (US); Clay Jones, Spokane, WA (US)

(73) Assignee: F5 Networks, Inc., Seattle, WA (US)

( * ) Notice: Subject to any disclaimer, the term of this patent is extended or adjusted under 35 U.S.C. 154(b) by 922 days.

(21) Appl. No.: 12/689,832

(22) Filed: Jan. 19, 2010

(65) Prior Publication Data
US 2015/0019923 A1 Jan. 15, 2015

Related U.S. Application Data

(60) Provisional application No. 61/205,271, filed on Jan. 16, 2009.

(51) Int. Cl.
*G06F 11/00* (2006.01)
*G06F 13/28* (2006.01)
*G06F 11/16* (2006.01)
*G06F 15/173* (2006.01)

(52) U.S. Cl.
CPC ............... *G06F 11/00* (2013.01); *G06F 11/16* (2013.01); *G06F 13/28* (2013.01); *G06F 15/17331* (2013.01)

(58) Field of Classification Search
USPC .......................................... 714/23, 5.11, 6.13
See application file for complete search history.

(56) References Cited

U.S. PATENT DOCUMENTS

| 4,914,650 | A | 4/1990 | Sriram |
| 5,388,237 | A | 2/1995 | Sodos |
| 5,477,541 | A | 12/1995 | White et al. |

(Continued)

FOREIGN PATENT DOCUMENTS

| EP | 0803819 A2 | 10/1997 |
| EP | 1813084 A1 | 8/2007 |
| WO | 2006/055494 A1 | 5/2006 |

OTHER PUBLICATIONS

"Cavium Networks Product Selector Guide—Single & Multi-Core MIPS Processors, Security Processors and Accelerator Boards—Spring 2008," at www.caviumnetworks.com, 2008, pp. 1-44, Cavium Networks, Mountain View, CA, US.

(Continued)

*Primary Examiner* — Sarai Butler
(74) *Attorney, Agent, or Firm* — LeClairRyan, a Professional Corporation

(57) ABSTRACT

A method, computer readable medium, and system independently managing network applications within a network traffic management device communicating with networked clients and servers include monitoring with a network device a plurality of applications communicating over a plurality of direct memory access (DMA) channels established across a bus. The network device receives a request from a first application communicating over a first DMA channel in the plurality of DMA channels to restart the first DMA channel. In response to the request, the first DMA channel is disabled with the network device while allowing other executing applications in the plurality of applications to continue to communicate over other DMA channels in the plurality of DMA channels. A state of the first DMA channel is cleared independently from other DMA channels in the plurality of DMA channels, and communications for the first application over the first DMA channel are resumed with the network device.

18 Claims, 6 Drawing Sheets

(56) References Cited

U.S. PATENT DOCUMENTS

| | | | |
|---|---|---|---|
| 5,699,361 A | 12/1997 | Ding et al. | |
| 5,742,765 A | 4/1998 | Wong et al. | |
| 5,761,534 A | 6/1998 | Lundberg et al. | |
| 5,797,033 A | 8/1998 | Ecclesine | |
| 5,828,835 A | 10/1998 | Isfeld et al. | |
| 5,941,988 A | 8/1999 | Bhagwat et al. | |
| 5,948,080 A | 9/1999 | Baker | |
| 6,026,090 A | 2/2000 | Benson et al. | |
| 6,026,443 A | 2/2000 | Oskouy et al. | |
| 6,070,219 A | 5/2000 | McAlpine et al. | |
| 6,115,802 A | 9/2000 | Tock et al. | |
| 6,347,337 B1 | 2/2002 | Shah et al. | |
| 6,388,989 B1 | 5/2002 | Malhotra | |
| 6,529,508 B1 | 3/2003 | Li et al. | |
| 6,574,220 B1 | 6/2003 | Petty | |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,785,236 B1 | 8/2004 | Lo et al. | |
| 6,820,133 B1 | 11/2004 | Grove et al. | |
| 6,934,776 B2 | 8/2005 | Connor et al. | |
| 7,046,628 B2 | 5/2006 | Luhmann et al. | |
| 7,065,630 B1 | 6/2006 | Ledebohm et al. | |
| 7,107,348 B2 | 9/2006 | Shimada et al. | |
| 7,117,308 B1 | 10/2006 | Mitten et al. | |
| 7,124,196 B2 | 10/2006 | Hooper | |
| 7,142,540 B2 | 11/2006 | Hendel et al. | |
| 7,164,678 B2 | 1/2007 | Connor | |
| 7,236,491 B2 | 6/2007 | Tsao et al. | |
| 7,281,030 B1 | 10/2007 | Davis | |
| 7,324,525 B2 | 1/2008 | Fuhs et al. | |
| 7,327,674 B2 | 2/2008 | Eberle et al. | |
| 7,349,405 B2 | 3/2008 | Deforche | |
| 7,355,977 B1 | 4/2008 | Li | |
| 7,376,772 B2 | 5/2008 | Fallon | |
| 7,403,542 B1 | 7/2008 | Thompson | |
| 7,420,931 B2 | 9/2008 | Nanda et al. | |
| 7,475,122 B2 * | 1/2009 | Azpitarte | 709/217 |
| 7,478,186 B1 | 1/2009 | Onufryk et al. | |
| 7,496,695 B2 | 2/2009 | Go et al. | |
| 7,500,028 B2 | 3/2009 | Yamagishi | |
| 7,512,721 B1 | 3/2009 | Olson | |
| 7,533,197 B2 | 5/2009 | Leonard et al. | |
| 7,558,910 B2 | 7/2009 | Alverson et al. | |
| 7,571,299 B2 | 8/2009 | Loeb | |
| 7,647,416 B2 | 1/2010 | Chiang et al. | |
| 7,657,659 B1 | 2/2010 | Lambeth et al. | |
| 7,668,727 B2 | 2/2010 | Mitchell et al. | |
| 7,668,851 B2 | 2/2010 | Triplett | |
| 7,729,239 B1 | 6/2010 | Aronov et al. | |
| 7,735,099 B1 | 6/2010 | Micalizzi, Jr. | |
| 7,742,412 B1 | 6/2010 | Medina | |
| 7,784,093 B2 | 8/2010 | Deng et al. | |
| 7,826,487 B1 | 11/2010 | Mukerji et al. | |
| 7,877,524 B1 | 1/2011 | Annem et al. | |
| 7,916,728 B1 | 3/2011 | Mimms | |
| 7,929,433 B2 | 4/2011 | Husak et al. | |
| 8,001,430 B2 * | 8/2011 | Shasha et al. | 714/56 |
| 8,006,016 B2 | 8/2011 | Muller et al. | |
| 8,103,809 B1 * | 1/2012 | Michels et al. | 710/22 |
| 8,112,491 B1 | 2/2012 | Michels et al. | |
| 2001/0038629 A1 | 11/2001 | Shinohara | |
| 2002/0143955 A1 | 10/2002 | Shimada et al. | |
| 2003/0067930 A1 | 4/2003 | Salapura et al. | |
| 2003/0204636 A1 | 10/2003 | Greenblat et al. | |
| 2004/0032830 A1 | 2/2004 | Bly et al. | |
| 2004/0062245 A1 | 4/2004 | Sharp et al. | |
| 2004/0202161 A1 | 10/2004 | Stachura et al. | |
| 2004/0249948 A1 | 12/2004 | Sethi et al. | |
| 2004/0267897 A1 | 12/2004 | Hill et al. | |
| 2005/0007991 A1 | 1/2005 | Ton et al. | |
| 2005/0083952 A1 | 4/2005 | Swain | |
| 2005/0091390 A1 | 4/2005 | Helmer et al. | |
| 2005/0114559 A1 | 5/2005 | Miller | |
| 2005/0141427 A1 | 6/2005 | Bartky | |
| 2005/0175014 A1 | 8/2005 | Patrick | |
| 2005/0226234 A1 | 10/2005 | Sano et al. | |
| 2006/0007928 A1 | 1/2006 | Sangillo | |
| 2006/0104303 A1 | 5/2006 | Makineni et al. | |
| 2006/0221832 A1 | 10/2006 | Muller et al. | |
| 2006/0221835 A1 | 10/2006 | Sweeney | |
| 2006/0224820 A1 | 10/2006 | Cho et al. | |
| 2006/0235996 A1 | 10/2006 | Wolde et al. | |
| 2006/0288128 A1 | 12/2006 | Moskalev et al. | |
| 2007/0162619 A1 | 7/2007 | Aloni et al. | |
| 2008/0126509 A1 | 5/2008 | Subramanian et al. | |
| 2008/0184248 A1 | 7/2008 | Barua et al. | |
| 2008/0201772 A1 | 8/2008 | Mondaeev et al. | |
| 2009/0003204 A1 | 1/2009 | Okholm et al. | |
| 2009/0016217 A1 | 1/2009 | Kashyap | |
| 2009/0089215 A1 * | 4/2009 | Huang et al. | 714/37 |
| 2009/0154459 A1 | 6/2009 | Husak et al. | |
| 2009/0222598 A1 | 9/2009 | Hayden | |
| 2009/0248911 A1 | 10/2009 | Conroy et al. | |
| 2009/0279559 A1 | 11/2009 | Wong et al. | |
| 2010/0082849 A1 | 4/2010 | Millet et al. | |
| 2010/0085875 A1 | 4/2010 | Solomon et al. | |
| 2010/0094945 A1 | 4/2010 | Chan et al. | |
| 2011/0228781 A1 | 9/2011 | Izenberg et al. | |
| 2012/0191800 A1 | 7/2012 | Michels et al. | |
| 2013/0250777 A1 | 9/2013 | Ziegler | |
| 2014/0032695 A1 | 1/2014 | Michels et al. | |

OTHER PUBLICATIONS

"Comtech AHA Announces 3.0 Gbps GZIP Compression/Decompression Accelerator AHA362-PCIX offers high-speed GZIP compression and decompression," at www.aha.com, Apr. 20, 2005, pp. 1-2, Comtech AHA Corporation, Moscow, ID, USA.

"Comtech AHA Announces GZIP Compression and Decompression IC Offers the highest speed and compression ratio performance in hardware on the market," at www.aha.com, Jun. 26, 2007, pp. 1-2, Comtech AHA Corporation, Moscow, ID, USA.

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

"NITROX™ XL Security Acceleration Modules PCI 3V or 3V/5V-Universal Boards for SSL and IPSec," at http://www.Caviumnetworks.com, 2002, pp. 1, Cavium Networks, Mountain View, CA USA.

"PCI, PCI-X," at http://www.cavium.com/acceleration_boards_PCI_PCI-X.htm, downloaded Oct. 2008, Cavium Networks—Products > Acceleration Boards > PCI, PCI-X.

"Plan 9 kernel history: overview / file list / diff list," <http://switch.com/cgi-bin/plan9history.cgi?f=2001/0126/pc/etherga620.com>, accessed Oct. 22, 2007, pp. 1-16.

Salchow, Jr., KJ, "Clustered Multiprocessing: Changing the Rules of the Performance Game," F5 White Paper, Jan. 2008, pp. 1-11, F5 Networks, Inc.

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

http://lwn.net/images/pdf/LDD3/ch15.pdf, "Memory Mapping and DMA," Chapter 15, pp. 412-63 (Jan. 2005).

Eventhelix.com, "DMA and Interrupt Handling," at http://www.eventhelix.com/RealtimeMantra/FaultHandling/dma_interrupt_handling.htm (Downloaded Oct. 2009).

Eventhelix.com, "TCP-Transmission Control Protocol (TCP Fast Retransmit and Recovery)," (Mar. 2002).

Harvey, "DMA Fundamentals on Various PC Platforms," National Instruments, Application Note 011, pp. 1-18 (Apr. 1991).

Mangino, "Using DMA with High Performance Peripherals to Maximize System Performance," WW TMS470 Catalog Applications, at http://focus.ti.com/lit/wp/spna105/spna105.pdf (Jan. 2007).

Mogul, "The Case for Persistent-Connection HTTP," SIGCOMM, Cambridge, MA USA pp. 299-313 (Oct. 1995).

Rabinovich et al., "DHTTP: An Efficient and Cache-Friendly Transfer Protocol for the Web," IEEE/ACM Transactions on Networking 12(6):1007-20 (Dec. 2004).

(56) References Cited

OTHER PUBLICATIONS

Stevens, "TCP Slow Start, Congestion Avoidance, Fast Retransmit, and Fast Recovery Algorithms," Standards Track Memo pp. 1-6 (Jan. 1997).

Wadge, "Achieving Gigabit Performance on Programmable Ethernet Network Interface Cards," pp. 1-9 (May 2001).

Welch, "A User's Guide to TCP Windows," pp. 1-5 (Jun. 1996).

Wikipedia, "Direct Memory Access," at http://en.wikipedia.org/wiki/Direct_memory_access, pp. 1-6 (Downloaded Oct. 2009).

Wikipedia, "Nagle's Algorithm," at Nagle's Algorithm—Wikeopedia.xps (Last Modified Oct. 2009).

* cited by examiner

NETWORK DEVICES WITH MULTIPLE FULLY ISOLATED AND INDEPENDENTLY RESETTABLE DIRECT MEMORY ACCESS CHANNELS AND METHODS THEREOF

PRIORITY CLAIM

This application claims the benefit of U.S. Provisional Patent Application Ser. No. 61/205,271, filed on Jan. 16, 2009, entitled "Network Interface Systems with Multiple, Fully Isolated and Independently Resettable, Direct Memory Access Channels and Methods Thereof," which is hereby incorporated by reference in its entirety.

TECHNOLOGICAL FIELD

The technology generally relates to network traffic management, and more particularly, to network devices, systems, and methods having multiple, fully isolated and independently resettable, direct memory access channels.

BACKGROUND

Modern network interface controller devices feature multiple direct memory access (DMA) channels. In emerging virtualized systems with multi-core, multi-operating system (OS), and/or multi-application architectures, this type of network interface controller allows multiple DMA drivers and/or applications to manage their own DMA resources.

However, the DMA channels in these devices usually share some common resources and, due to such sharing, cannot be independently reset and/or restarted. In the event that for a particular DMA channel, the DMA channel hardware, driver, or attached application needs to be reconfigured or if the software being supported by that DMA channel crashes, there is no graceful way to recover without impacting all users and software associated with all the DMA channels of the network interface controller's DMA services. In the worst case, the entire system can be reset and rebooted from scratch. These devices do not support or provide the desired performance of resetting or restarting a single DMA channel without impacting operations of other DMA channels.

SUMMARY

A method for independently managing network applications within a network traffic management device communicating with networked clients and servers includes monitoring with a network device a plurality of applications communicating over a plurality of direct memory access (DMA) channels established across a bus. The network device receives a request from a first application communicating over a first DMA channel in the plurality of DMA channels to restart the first DMA channel. The first DMA channel is disabled with the network device in response to the request while allowing other executing applications in the plurality of applications to continue to communicate over other DMA channels in the plurality of DMA channels. The method includes clearing a state of the first DMA channel independently from other DMA channels in the plurality of DMA channels. Communications for the first application over the first DMA channel are then resumed with the network device for the first application over the first DMA channel.

A computer readable medium having stored thereon instructions for independently managing network applications within a network traffic management device communicating with networked clients and servers comprising machine executable code which when executed by at least one processor, causes the processor to perform steps including monitoring with a network device a plurality of applications communicating over a plurality of direct memory access (DMA) channels established across a bus. The processor is further caused to perform steps including receiving at the network device a request from a first application communicating over a first DMA channel in the plurality of DMA channels to restart the first DMA channel. The first DMA channel is disabled in response to the request while allowing other executing applications in the plurality of applications to continue to communicate over other DMA channels in the plurality of DMA channels. The processor is then caused to perform clearing a state of the first DMA channel independently from other DMA channels in the plurality of DMA channels, and resuming with the network device communications for the first application over the first DMA channel.

An application delivery controller includes one or more processors, a memory coupled to the one or more processors by a bus, and a network interface controller coupled to the one or more processors and the memory and configured to be capable of receiving and forwarding data packets from a network that relate to a plurality of applications. At least one of the one or more processors executes programmed instructions and the network interface controller with logic is configured to implement monitoring with a network device a plurality of applications communicating over a plurality of direct memory access (DMA) channels established across a bus, receiving at the network device a request from a first application communicating over a first DMA channel in the plurality of DMA channels to restart the first DMA channel, disabling the first DMA channel with the network device in response to the request while allowing other executing applications in the plurality of applications to continue to communicate over other DMA channels in the plurality of DMA channels, clearing a state of the first DMA channel independently from other DMA channels in the plurality of DMA channels, and resuming with the network device communications for the first application over the first DMA channel.

DETAILED DESCRIPTION

Figure 1A:
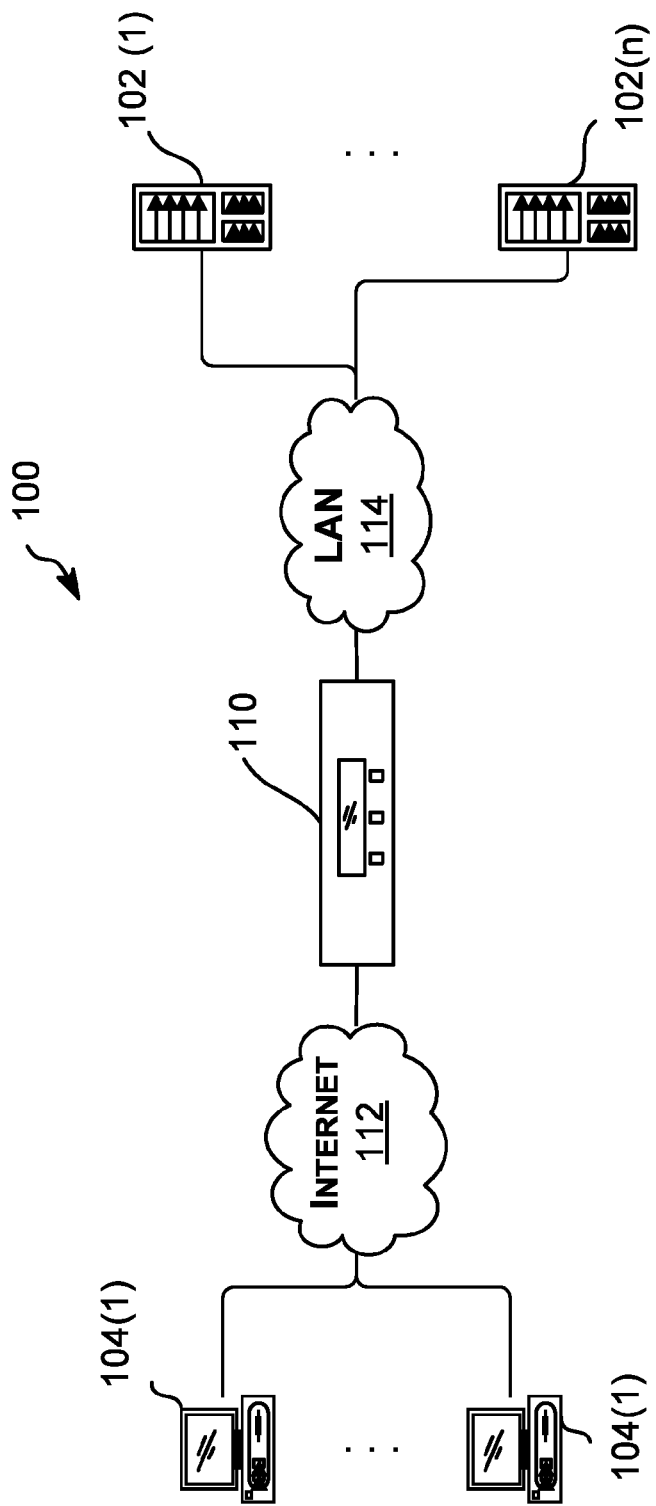
FIG. 1A is a diagram showing a network environment that may employ a network traffic management device, e.g., an application delivery controller, configured to handle multiple, fully isolated and independently resettable, direct memory access channels.

Referring to FIG. 1A, an exemplary network system 100 using a multiple DMA channel based application delivery controller 110 that can provide multiple independently resettable DMA channels is depicted. The application delivery controller 110 can handle a request to restart a DMA channel from an executing application and/or unexpected or unplanned application crashes in a graceful way without affecting all DMA channels, in addition to other functions such as increasing network quality of service for packets with connection state to servers 102(1) to 102(n) and allowing processing packets on a priority determined based on classification of service. A network 112 can provide responses and requests according to the HTTP-based application request for comments (RFC) protocol or the Common Internet File System (CIFS) or network file system (NFS) protocol in this example, but the principles discussed herein are not limited to these examples and can include other application protocols. The system 100 can include a series of one or more client devices such as client computers 104(1) to 104(n) (also interchangeably referred to as client devices, client computing devices, client systems, client computing systems, or clients), and an application delivery controller 110 coupling the servers 102(1) to 102(n) to the client devices 104(1) to 104(n) through the network 112. For clarity and brevity, in FIG. 1A two server devices 102(1) and 102(n) are shown, but it should be understood that any number of server devices can use the exemplary network system 100. Likewise, two client devices 104(1)-104(n) are shown in FIG. 1A, but any number of client devices can also use the exemplary network system 100 as well. The ellipses and the designation "n" in FIG. 1A denote an unlimited number of server devices and client devices, respectively.

Servers 102(1)-102(n) comprise one or more server computing machines capable of operating one or more Web-based applications that may be accessed by network devices in the network 112, such as client devices 104(1)-104(n) (also referred to as client computers 104(1)-104(n)), via application delivery controller 110, and may provide other data representing requested resources, such as particular Web page(s), image(s) of physical objects, and any other objects, responsive to the requests, although the servers 102(1)-102(n) may perform other tasks and provide other types of resources. It should be noted that one or more of the servers 102(1)-102(n) may be a cluster of servers managed by a network traffic management device such as application delivery controller 110.

The client computers 104(1)-104(n) in this example can run interface applications such as Web browsers that can provide an interface to make requests for and send data to different Web server-based applications via the network 112. A series of applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). As per the TCP, packets can be sent to the servers 102(1)-102(n) from the requesting client computers 104(1)-104(n) to send data. It is to be understood that the servers 102(1)-102(n) can be hardware or software or can represent a system with multiple servers, which can include internal or external networks. In this example the servers 102(1)-102(n) can be any version of Microsoft® IIS servers or Apache® servers, although other types of servers can be used. Further, additional servers can be coupled to the network 112 and many different types of applications can be available on servers coupled to the network 112.

Generally, the client devices such as the client computers 104(1)-104(n) can include virtually be any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the network 112. A series of Web-based applications can run on the application servers 102(1)-102(n) that allow the transmission of data that is requested by the client computers 104(1)-104(n). The client computers 104(1)-104(n) can be further configured to engage in a secure communication with the application delivery controller 110 and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, such as the Internet, which includes client computers 104(1)-104(n), although the network 112 may comprise other types of private and public networks that include other devices. Communications, such as requests from client computers 104(1)-104(n) and responses from servers 102(1)-102(n), take place over the network 112 according to standard network protocols, such as the HTTP and TCP/IP protocols in this example, but the principles discussed herein are not limited to this example and can include other protocols. Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 includes any communication medium and method by which data may travel between client devices 104(1)-104(n), servers 102(1)-102(n) and application delivery controller 110, and these examples are provided by way of example only.

Each of the servers 102(1)-102(n), application delivery controller 110, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of distributed processing, such as redundancy, replication, and the like, also can be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

LAN 114 comprises a private local area network that includes the application delivery controller 110 coupled to the one or more servers 102(1)-102(n), although the LAN 114 may comprise other types of private and public networks with other devices. Networks, including local area networks, besides being understood by those skilled in the relevant arts, have already been generally described above in connection with network 112, and thus will not be described further here.

As shown in the example environment of network system 100 depicted in FIG. 1A, the application delivery controller 110 can be interposed between the network 112 and the servers 102(1)-102(n) in LAN 114 as shown in FIG. 1A. Again, the network system 100 could be arranged in other manners with other numbers and types of devices. Also, the application delivery controller 110 is coupled to network 112 by one or more network communication links and intermediate network devices, such as routers, switches, gateways, hubs and other devices (not shown). It should be understood that the devices and the particular configuration shown in FIG. 1A are provided for exemplary purposes only and thus are not limiting in number or type.

Generally, the application delivery controller 110 is an exemplary network traffic management device that performs managing network communications, which may include managing one or more client requests and server responses, from/to the network 112 between the client devices 104(1)-104(n) and one or more of the servers 102(1)-102(n) in LAN 114 in these examples. An example application delivery controller 110 can be the BIG-IP® device provided by F5 networks, Inc. of Seattle, Wash. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the application delivery controller 110, for example. In any case, the application delivery controller 110 may manage the network communications by performing several network traffic management related functions involving the communications, such as load balancing, access control, VPN hosting, network traffic acceleration, and applying quality of service levels to multiple direct memory access channels in accordance with the processes described further below in connection with FIGS. 1B-5, for example.

Figure 1B:
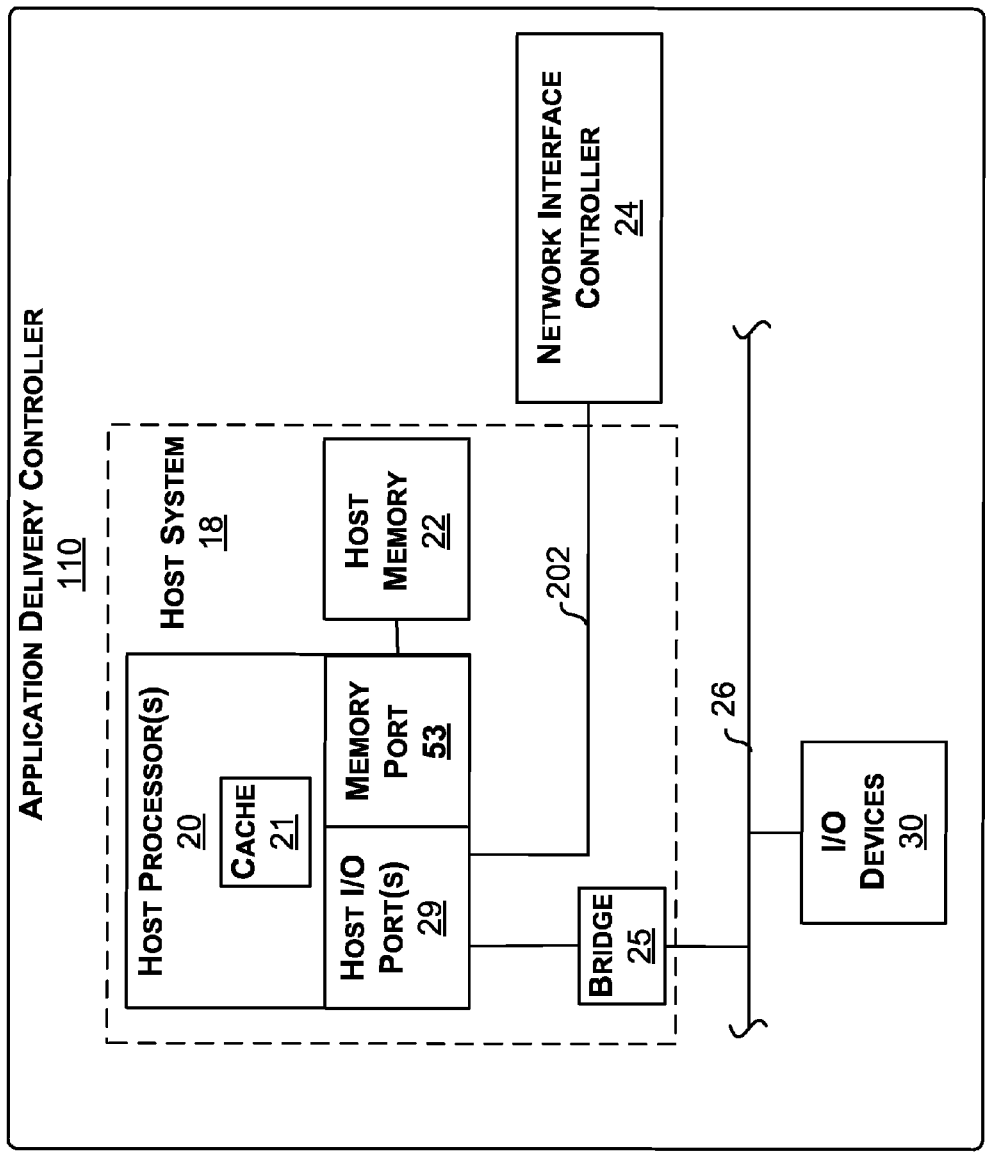
FIG. 1B is a partly functional and partly schematic diagram of an application delivery controller shown in FIG. 1A.

FIG. 1B illustrates the example application delivery controller 110 in more detail. Included within the application delivery controller 110 is a system bus 26 (also referred to as bus 26) that communicates with a host system 18 via a bridge 25 and with an I/O device 30. In this example, a single I/O device 30 is shown to represent any number of I/O devices connected to bus 26. In one example, bridge 25 is in further communication with a host processor 20 (also referred to as host system processor 20) via host I/O ports 29. Host processor 20 can further communicate with a network interface controller 24 (also referred to as network transceiver logic) via a CPU bus 202, a host memory 22 or host system memory 22 (via a memory port 53), and a cache memory 21. As outlined above, included within the host processor 20 are host I/O ports 29, memory port 53, and a main processor (not shown separately).

In one example, application delivery controller 110 can include the host processor 20 characterized by any one or more of the following component configurations: computer readable medium and logic circuits that respond to and process instructions fetched from the host memory 22; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

In some examples, the application delivery controller 110 includes the host processor 20 that communicates with cache memory 21 via a secondary bus also known as a backside bus, while some other examples, the application delivery controller 110 includes the host processor 20 that communicates with cache memory via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other examples of the application delivery controller 110 include I/O device 30 that is a video display (not shown separately) that communicates with the host processor 20 via an Advanced Graphics Port (AGP).

Still other versions of the application delivery controller 110 include host processor 20 connected to an I/O device 30 via any one of the following connections: HyperTransport, Rapid I/O, PCI Express, or InfiniBand, although other types of connections may be used. Further examples of the application delivery controller 110 include a communication connection where the host processor 20 communicates with one I/O device 30 using a local interconnect bus and with a second I/O device (not shown separately) using a direct connection. Included within some examples of the application delivery controller 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Further examples include host processor 20 that can access the host memory 22 via one of either: system bus 26; memory port 53; or any other connection, bus or port that allows the host processor 20 to access host memory 22.

One example of the application delivery controller 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can, in some examples, include a client agent, or any portion of a client agent. The application delivery controller 110 may further include a storage device (not shown separately) that can be either one or more hard disk drives, or one or more redundant arrays of independent disks; where the storage device is configured to store an operating system, software, programs applications, or at least a portion of the client agent. A further example of the application delivery controller 110 can include an installation device that is used as the storage device.

Furthermore, the application delivery controller 110 may include network interface controller 24 to communicate with LAN 114, a Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the application delivery controller 110 includes network interface controller 24 able to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card (NIC); a PCMCIA network card; a card bus network adapter; a wireless network adapter; a USB network adapter; a modem; or any other device suitable for interfacing the application delivery controller 110 to a network, the application delivery controller being capable of and configured to perform the methods and implement the systems described herein.

In various examples, the application delivery controller 110 can include any one of the following I/O devices 30: a keyboard; a pointing device; a mouse; a gesture based remote control device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

Figure 2:
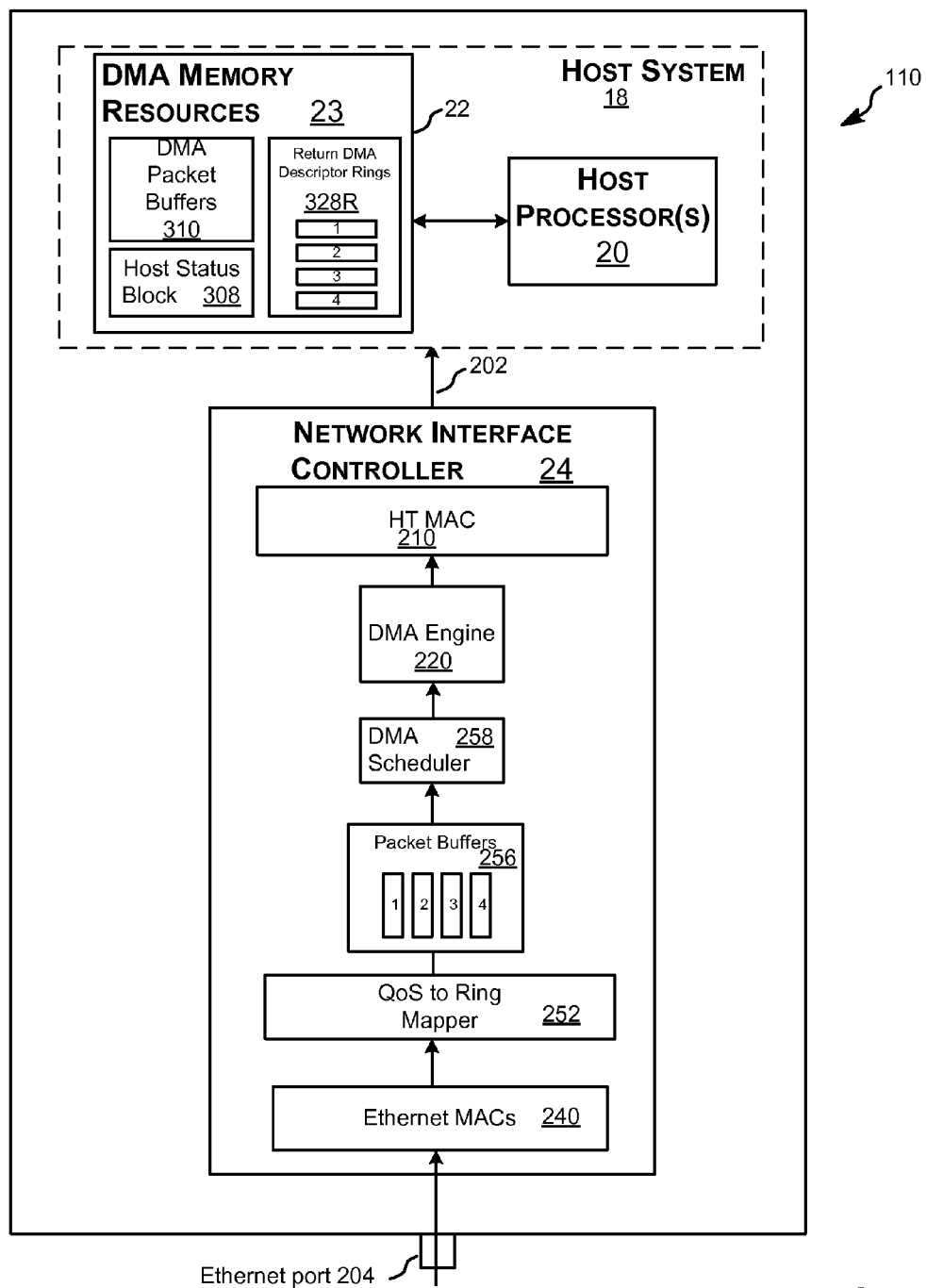
FIG. 2 is a diagram of a packet receive scenario handled by the application delivery controller of FIGS. 1A and 1B.

According to various examples, receive and transmit scenarios handled by the application delivery controller 110, will be described below with reference to FIGS. 2 and 3, respectively. For example, as explained below, FIG. 2 shows handling of one or more network packets using respective independently resettable DMA channels by the network interface controller 24 and host system 18. Similarly, by way of example, as explained below, FIG. 3 shows transmission of one or more packets from application delivery controller 110 to servers 102(1)-102(n) and/or client computing devices 104(1)-104(n) over network 110 (and/or, LAN 114) using independently resettable DMA channels maintained by the network interface controller 24 and host system 18.

Example Receiving Data Packets from the Network (Return DMA Operation)

Figure 3:
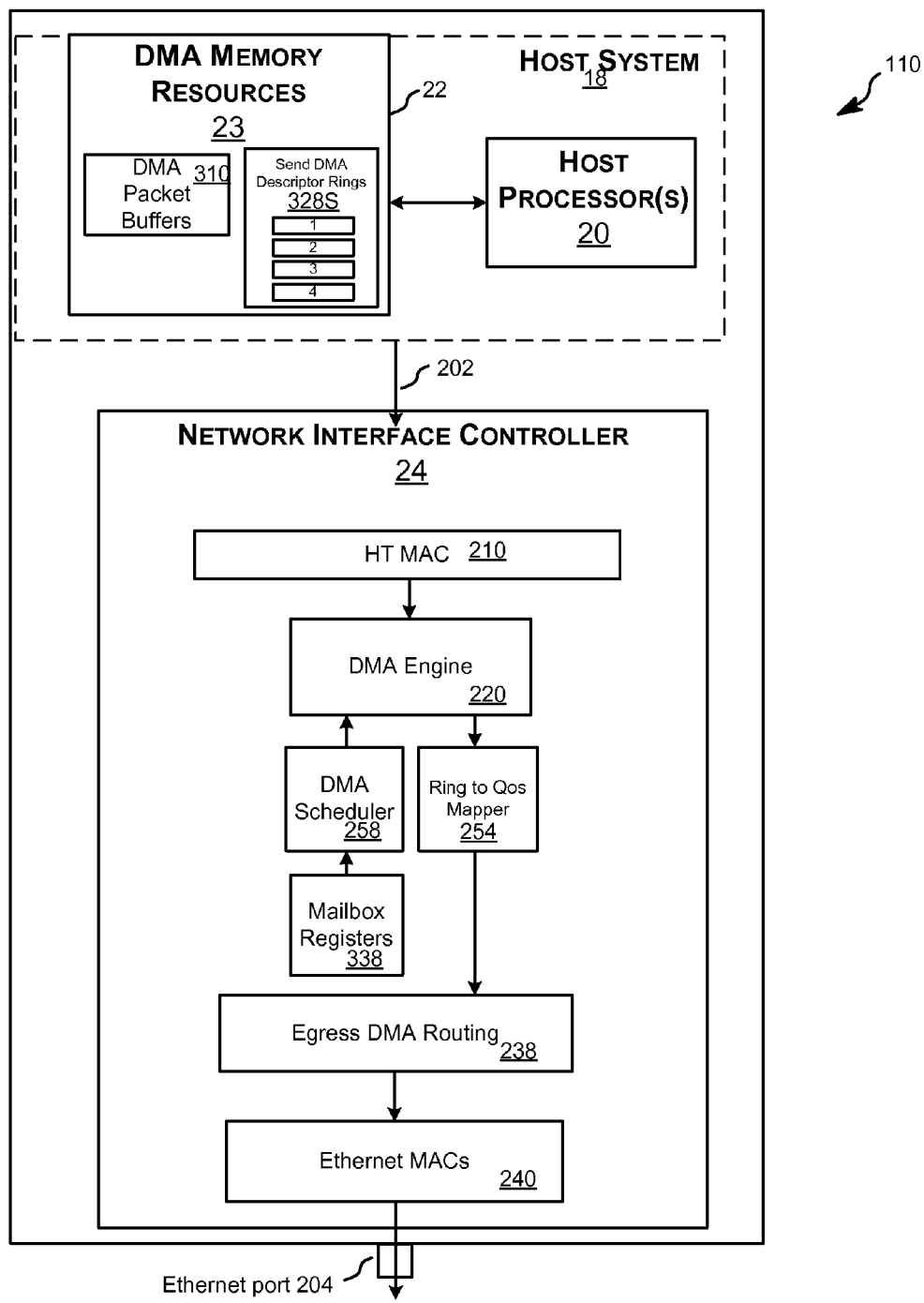
FIG. 3 is a diagram of a packet transmit scenario handled by the application delivery controller of FIGS. 1A and 1B.

As shown in FIGS. 2 and 3, DMA operations between the host system 18 and the network interface controller 24 are organized into DMA channels under control of a DMA packet engine, such as a packet DMA engine 220 (interchangeably referred to as a DMA engine 220). DMA packet engine couples to CPU bus 208 via a CPU bus MAC interface, for example, a HyperTransport (HT) MAC 210 shown in FIGS. 2 and 3, which HT MAC 210 can include or may be coupled to a serial to parallel data splitter/demultiplexer (not shown) within network interface controller 24. A DMA channel is comprised of a set of data structures, some of which reside in host memory 22 that includes computer readable medium and instructions that are thereupon stored which when executed by at least one processor, causes the processor to perform steps of FIGS. 4 and 5, and some of which reside in the network interface controller 24. By employing multiple packet DMA engines such as DMA engine 220 with multiple rings, DMA channels can be independently reset, and can be used to extend network quality of service from peripheral I/O devices on the network 112 and/or LAN 114 to the host system 18's DMA system and DMA memory resources 23.

Referring now to FIG. 2, an example application delivery controller 110 including the network interface controller 24 is shown that may be used in the network system 100 depicted in FIG. 1A to control multiple independently resettable DMA channels for managing network traffic (e.g., network packets), and to perform other functions, for example, implementing network quality of service. In this example, the network interface controller 24 is implemented in a Field-programmable gate array (FPGA), although other specialized hardware could be used, such as application-specific integrated circuits (ASICs). Generally, the network interface controller 24 with network transceiver logic inside is used to bridge network data traffic between host system 18 and one or more high speed input/output (I/O) devices.

In the example shown in FIG. 2, application delivery controller 110 receives network data packets from a network, such as network 112 shown in FIG. 1A. A return DMA operation is performed when the network interface controller 24 uses a DMA channel to move a block of data received from a network (e.g., network 112) into host memory 22 for further processing, forwarding to a LAN 114, or retransmission, for example. In this example, the network interface controller 24 connects to a host processor complex, such as host system 18, over CPU bus 202. I/O devices are attached to the network interface controller 24 with interfaces appropriate to each such device. One such device can be an Ethernet port 204 coupled to an Ethernet connection that in this example can be a 10 Gigabit Ethernet connection. The Ethernet port 204 can provide communication with the network 112 as shown in FIG. 1A. The network interface controller 24 provides DMA services to the host system 18 on behalf of its attached I/O devices. DMA services are provided through one or more DMA channels that support respective executing applications and programs. Each DMA channel supports the movement of data traffic between the I/O devices and the host memory 22.

The example shown in FIG. 2 follows the flow of a received network data packet as it arrives at the application delivery controller 110. The network data packet arrives at Ethernet port 204. As further shown in FIG. 2, the network interface controller 24 includes an Ethernet media access control (MAC) 240 and other peripheral interfaces (not shown separately). The Ethernet MAC 240 in this example is coupled to the Ethernet port 204 to receive packets from the network 112 as shown in FIG. 1A.

In one example, network interface controller 24 further includes a QoS to Ring Mapper 252. The QoS to Ring Mapper 252 extends network quality-of-service (QoS) all the way from the network 112 to a CPU complex associated with host processor 20. QoS to Ring Mapper 252 maps the received network data packet to a return DMA ring and carries the QoS from the network 112 to the host system 18 through network interface controller 24. In the following examples, quality of service (QoS) and class of service (CoS) are used interchangeably.

QoS to Ring Mapper 252 inspects each packet to determine its HiGig Destination Port and class of service (CoS) level. The destination port is used as an index into a mapping table to determine which DMA channel should receive the packet. In this example, a table can contain an entry for each of the 32 possible HiGig port values.

QoS to Ring Mapper 252 selects a DMA channel and selects a return DMA ring (e.g., return DMA descriptor ring 328R) based on QoS markings in the received data packet(s) and the peripheral port, such as Ethernet port 204. Once the DMA channel is determined, the CoS value in the packet is used to index into a ring mapping table. Each DMA channel as represented by the packet DMA engine 220 has a unique instance of the ring mapping table. Each ring mapping table contains an entry for each CoS value. The ring mapping table selects which DMA ring within the DMA channel should receive the packet.

Network interface controller 24 also includes packet buffers 256 including, for example, individual buffers/registers 1-4. Packet buffers 256 serve as a queue from which a DMA scheduler 258 chooses packets to go to the packet DMA engine 220. Packet DMA engine 220 monitors the applicable levels in the packet buffers 256 to determine when a return DMA operation should be initiated. The packet buffers 256 are ring-specific. That is, when the QoS to Ring Mapper 252 identifies the DMA channel and DMA ring to which the packets will be sent based on the QoS markings in the packet and based upon the Ethernet port 204 on which the network packet arrives, the specific packet buffer 1-4 in packet buffers 256 and packet DMA engine 220 are identified.

The packet buffers 256 can receive their own programmable minimum and maximum addresses that determine a size of the packet buffers 256. Programmable packet buffer size allows RAM storage to be shifted to match the anticipated requirements of traffic destined for each packet buffer (e.g., individual buffers/registers 1-4 within packet buffers 256). Unused packet buffers can be squeezed down to nothing, and all the RAM space can be allocated to actively used packet buffers. For example, packet buffers receiving low priority, high bandwidth, and delay tolerant traffic can be made very large. Further by way of example, packet buffers receiving high priority, low bandwidth, and delay sensitive traffic can be made small.

DMA scheduler 258 chooses packets out of packet buffers 256 based upon the priority of the queued network data packets and schedules the transfer to the appropriate packet DMA engine 220. For clarity and brevity, only a single packet buffer, a single DMA scheduler, and DMA engine are shown in FIG. 2, but it should be understood that additional packet buffers, DMA schedulers, and DMA engines supporting multiple independently resettable DMA channels can be included in network interface controller 24.

The packet buffers 256 are selected based on a strict priority scheduling scheme using DMA scheduler 258. The DMA scheduler 258 selects which descriptor ring 1-4 out of return DMA descriptor rings 328R (also referred to as return DMA rings, or send rings) within DMA memory resources 23 to service and the matching packet buffer 256 is accessed for a single packet. The scheduling process is then repeated for the next packet.

Each network packet retrieved from a packet buffer 256 is routed to the appropriate DMA channel controlled by the respective packet DMA engine such as the packet DMA engine 220 in FIG. 2. The DMA channel segments the network packet for delivery to host memory 22 via several, smaller, HyperTransport packets. These HyperTransport packets are interleaved with HyperTransport packets from the other DMA channels in the network interface controller 24.

For host bound packets, the network packets can be parsed and stripped of a HiGig header, the IP and TCP/UDP checksums can be checked, and the packet's length can be determined. Packet data is forwarded to the appropriate packet DMA engine 220 along with additional packet control information. The packet control information is used by the selected packet DMA engine within DMA engine 220 to fill out packet specific fields in a DMA return descriptor in descriptor rings 1-4 of return DMA descriptor rings 328R.

In one example, the network interface controller 24 supports four DMA channels and therefore there are four packet DMA engines each same as DMA engine 220. Each packet DMA engine can be a HyperTransport master and can initiate HyperTransport read and write transactions. The packet DMA engines perform the DMA operations required to move network packets between the attached I/O peripherals and host memory 22. DMA operations can be handled separately for the send (from host) and return (to host) directions.

For the host system 18 to receive a packet, a packet DMA engine such as the packet DMA engine 220 has an available producer descriptor, and a received packet is queued in the packet DMA engine 220. A producer descriptor describes an empty DMA packet buffer 310 in host memory 22. The packet DMA engine 220 pre-fetches producer descriptors from the host system 18 and holds them in a local cache (not shown). The producer descriptors are managed in part by entries in a host status block 308.

The host system 18 monitors the progress of the DMA operations performed by the packet DMA engine 220 via the host status block 308. Each packet DMA engine supports a host status block, such as the host status block 308 associated with the packet DMA engine 220. The host status block 308 contains ring status information for the return DMA descriptor rings 328R associated with the packet DMA engine 220. The host status block 308, in effect, tells the host processor 20 that there are data packets in the return DMA descriptor rings 328R. The host status block 308 can be a data structure in host memory 22 or a physical register or the like, and it is periodically updated by the packet DMA engine 220. The periodicity of these updates is determined by a host coalescing function. Host coalescing is controlled by a programmable set of activity counters and timers.

Packet data information is written to the return DMA descriptor rings 328R and the packet data is written into the DMA packet buffers 310 in host memory 22. The host processor 20, which is monitoring the host status block 308, notices a value change in the host status block 308. Detecting the changed condition, the host processor 20 continues the return DMA operation. The host processor 20 retrieves the DMA descriptor from the return DMA descriptor rings 328R. The DMA descriptor in the return DMA descriptor rings 328R points to the return data buffer and holds other information about the return data. The host processor 20 determines the order in which to service multiple return DMA descriptor rings 328R with pending descriptors, and the host processes the return data. The host processor 20 determines what to do with the network data packet.

During the data DMA, the packet data is mapped into one or more HyperTransport write transactions. When the data DMA operation is complete, the packet DMA engine 220 creates a return descriptor, writes it into the return DMA descriptor rings 328R in host memory 22, and notifies the host system 18. The return descriptor defines the specifics of the return DMA operation. In one example, multiple packet engines similar to DMA engine 220 support multiple return DMA descriptor rings 328R, allowing network quality of service disciplines to be extended into the host system 18's DMA system (including DMA memory resources 23) during receipt of a network data packet from the network.

DMA services are provided through one or more independently resettable DMA channels used by packet DMA engine 220. An example network interface controller 24 has four different DMA channels, each supporting the movement of data traffic between the I/O devices and the host system 18's main memory 22. Further by way of example only, each independently resettable DMA channel in the network interface controller 24 can have four quality of service rings, although a higher or a lower number of quality of service rings may be used. These individual rings can be associated with network quality of service levels. Packets can be mapped to the DMA rings based on the one or more Class of Service (CoS) fields/identifiers found in a HiGig header in each packet. The multiple DMA rings allow the network interface controller 24 to coherently extend network based quality of service to host based quality of service.

Each DMA channel in the network interface controller 24 operates independently and is composed of its own private data structures. DMA channels can be assigned to individual host CPUs and/or software threads. By providing independent DMA services to individual software threads, the network interface controller 24 allows for the scaling of system performance when used with multi-core host CPU systems. The isolation created by separate, non-shared, DMA channels also enhances the system's resiliency and redundancy capabilities. Each application on the host system 18 can attach to a DMA channel as its own private application delivery controller device or network interface controller device.

According to one example, each DMA channel can, independent of other DMA channels, receive a request to restart from one or more executing applications. In such a scenario, restart over a DMA channel can be performed independently without affecting operation of other DMA channel. According to another example, in an event of an unexpected software or application malfunction or "crash," the DMA channel supporting the application or software can be restarted independently without affect the operation of other DMA channels.

Example Transmitting Data Packets to the Network (Send DMA Operation)

FIG. 3 illustrates the DMA processes used by network interface controller 24 for using multiple independently resettable DMA channels and multiple quality of service rings for DMA channels to optimize network traffic, and for sending packets over network 112 and/or LAN 114.

As illustrated in FIG. 3, the host system 18 can send a network data packet stored in host memory 22 to the network 112 via network interface controller 24 and Ethernet port 204. A send DMA operation is performed when the host system 18 uses a DMA channel to move a block of data from host memory 22 to a network interface controller peripheral (not shown) via network 112. To perform a send DMA operation, the host processor 20 places the target network data packet into DMA packet buffer 310 and creates a DMA send descriptor (not shown separately) in send DMA descriptor rings 328S. The DMA send descriptor is jointly managed by the host system 18 and the network interface controller 24. The DMA send descriptor includes an address field and length field. The address field points to the start of the target network data packet in DMA packet buffer 310. The length field declares how many bytes of target data are present in the DMA packet buffer 310. The DMA send descriptor also has a set of bit flags (not shown) used to signal additional target data control and status information.

By way of example only, return DMA descriptor rings 328R and send DMA descriptor rings 328S can be physically same hardware memory blocks functioning as return and send DMA rings, respectively, at different times. Alternatively, separate and distinct memory blocks within host memory 22's DMA memory resources 23 may be reserved for each return DMA descriptor rings 328R and send DMA descriptor rings 328S, as can be contemplated by those of ordinary skill in the art after reading this disclosure.

Host system 18 places the send descriptor on the send DMA descriptor rings 328S in host system memory 22. The host processor 20 determines the QoS of the network packet to be transferred to the network 112 and moves the network packet to the appropriate DMA packet buffer 310 and places the descriptor on the appropriate descriptor rings 1-4 in send DMA descriptor rings 328S. The descriptor ring in send DMA descriptor rings 328S is chosen by the host system 18 selects the DMA channel, its associated peripheral, and the QoS level within the DMA channel. Send descriptors created by host system 18 in send DMA descriptor rings 328S can be of variable types, where each descriptor type can have a different format and size. The send DMA descriptor rings 328S is capable of holding descriptors of variable type.

The host processor 20 writes one or more mailbox registers 338 of the network interface controller 24 to notify the network interface controller 24 that the packet is ready. In performing this notification, the host processor 20 performs a write operation to a memory mapped network interface controller register (mailbox register 338). The host processor 20 can report the addition of multiple descriptors onto the send DMA ring in a single update, or alternatively, in multiple updates.

The appropriate packet DMA engine within DMA engine 220 is notified that the packet is ready. The packet DMA engine 220 can be selected from available DMA channels, or if a specific application has a dedicated DMA channel, the associated packet DMA engine 220 for that channel is used. The DMA engine 220 retrieves the DMA descriptor from the send DMA descriptor rings 328S. When multiple descriptors are outstanding in the send DMA descriptor rings 328S, the DMA Engine 220 may retrieve more than one descriptor.

Retrieving multiple descriptors at a time maximizes bus bandwidth and hardware efficiency. The DMA engine 220 is capable of receiving and processing send descriptors of variable type, format, and size.

As outlined above, the packet DMA engine 220 monitors the progress of the host DMA operations via a set of mailbox registers 338. Each packet DMA engine 220 supports its own set of mailbox registers 338. The mailbox registers 338 reside in a mapped address space of the network interface controller 24. When appropriate, the host processor 20 accesses the mailbox registers 338 by performing memory mapped read and write transactions to the appropriate target address. The mailbox registers 338 also contain ring status information for the Ring to QoS Mapper 254.

In this send DMA example, the packet DMA engine 220 reads the send descriptor, performs the DMA operation defined by it, and reports to the host system 18 that the DMA operation is complete. During the DMA operation, data is received from one or more CPU Bus read transactions (e.g., HyperTransport or PCI Express read transactions).

Ring to QoS Mapper 254 examines the assigned send DMA ring in send DMA descriptor rings 328S and receives packet data and packet control information from the packet DMA engine 220. Using the control information, the Ring to QoS Mapper 254 stamps the appropriate QoS onto the network data packet, thereby allowing host system 18 to send the network data packet back to the network 112. For example, using the control information, the Ring to QoS Mapper 254 can create and prepend a HiGig header to the packet data.

An egress DMA routing interface 238 arbitrates access to the network for DMA send packets. When a Ring to QoS Mapper 254 has a network packet ready to send, the egress DMA routing interface 238 arbitrates its access to the Ethernet port 204 and routes the packet to the correct interface if there is more than one present in the network interface controller 24. The egress DMA routing interface 238 behaves like a crossbar switch and monitors its attached interfaces for available packets. When a packet becomes available, the egress DMA routing interface 238 reads the packet from the selected ring to QoS mapper 254 and writes it to the destination interface. The egress DMA routing interface 238 moves complete packets to Ethernet MACs 240. When multiple sources are contending for egress DMA routing interface 238, the egress DMA routing interface 238 uses a fair round-robin arbitration scheme based on last packet transmission, although other arbitration schemes, for example, a weighted round-robin, may be used. According to one example, the arbitration scheme implemented by egress DMA routing interface 238 is fair on a per packet basis, not on a byte basis.

The network interface controller 24 provides DMA services to a host complex such as the host system 18 in FIGS. 2 and 3 on behalf of its attached I/O devices such as the Ethernet port 204. DMA operations involve the movement of data between the host memory 22 and the network interface controller 24. The network interface controller 24 creates and manages HyperTransport or other types of CPU Bus read/write transactions targeting host memory 22. Data transfer sizes supported by DMA channels maintained by various components of application delivery controller 110 are much larger than the maximum HyperTransport or CPU bus transaction size. The network interface controller 24 segments single DMA operations into multiple smaller CPU Bus or HyperTransport transactions. Additionally, the network interface controller 24 creates additional CPU bus or HyperTransport transactions to support the transfer of data structures between the network interface controller 24 and host memory 22.

In one example, multiple packet DMA engines similar to packet DMA engine 220 support multiple send DMA descriptor rings 328S, allowing network quality of service disciplines to be extended from the host system 18's DMA system (including DMA memory resources 23) through to the peripheral I/O devices attached to or on the network 112.

In both return and send operations, multiple DMA rings (e.g., send DMA descriptor rings 328S and return DMA descriptor rings 328R) allow the network interface controller 24 to coherently extend network based quality of service to host based quality of service. Extending the quality of service involves a number of processes in the network interface controller 24.

One example process is a packet to DMA ring mapping. Packet to DMA ring mapping occurs in both receiving and transmitting packets to/from the host system 18. In the case of receiving network data packets from a network and routing them to the host system 18, the received packets are inspected by the QoS to Ring Mapper 252 in the network interface controller 24. A class of service (CoS) field is present in a HiGig header in each field of the received network data packet. The CoS field is used to select a DMA return ring in return DMA descriptor rings 328R, such as those associated with packet DMA engine 220 in FIG. 2.

In the case of transmitting network data packets from the host system 18 out to network 112, the transmitted packets from the host system 18 are placed in a send DMA descriptor rings 328S such as one of the send DMA rings 1-4 in FIG. 3. The CoS value assigned to the send DMA ring transmitting the packet is then stamped into the CoS field of the HiGig header of the packet.

Another example process that occurs involves buffering of received data packets. Received packets are buffered based on the assigned return DMA ring within return DMA descriptor rings 328R. Since the return DMA rings are assigned based on network quality of service settings, the buffering is quality of service based. Packet dropping occurs when a packet buffer 1-4 within DMA packet buffers 256 overflows and is limited to the overflowing buffer. Other buffers and quality of service levels are unaffected by such an overflow. It is to be noted that although 4 buffers are shown in DMA packet buffers 256, a higher or lower number of individual buffers may be used.

An additional example process that takes place includes servicing the send and return DMA rings. The send and return DMA rings are serviced by a packet DMA engine such as the packet DMA engine 220 using a strict priority scheduling discipline. At the end of each send DMA operation, the highest priority send DMA ring with outstanding descriptors is selected for the next DMA operation. Similarly, at the end of each return DMA operation, the highest priority return DMA ring with outstanding packets in a receive buffer is selected for the next DMA operation. This scheduling allows higher priority traffic to be preferentially transmitted and received even when lower priority traffic is pending. Of course, other scheduling disciplines such as a weighted round robin could also be used.

Figure 4:
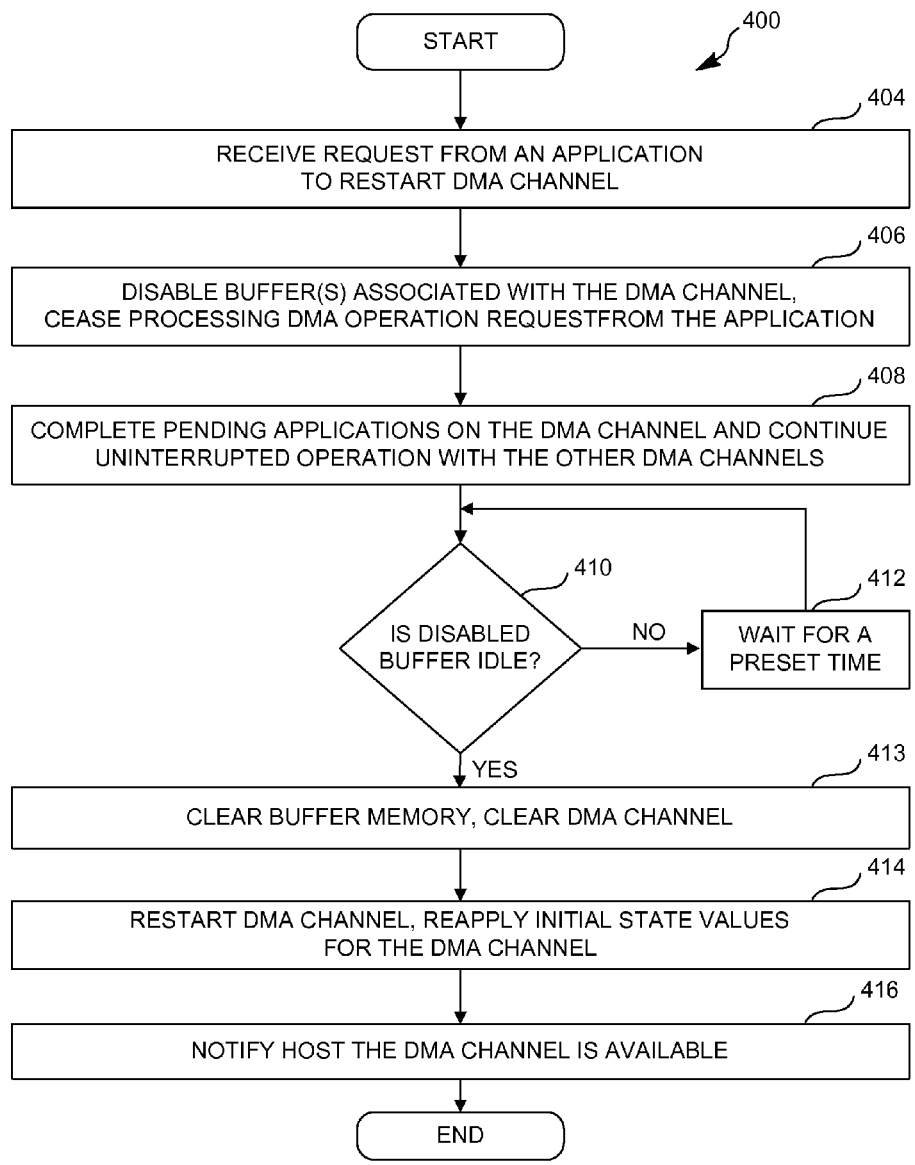
FIG. 4 is a flow chart for handling a request for restart of a DMA channel from an application executing over the DMA channel that may be performed by the application delivery controller in FIGS. 2 and 3.
Figure 5:
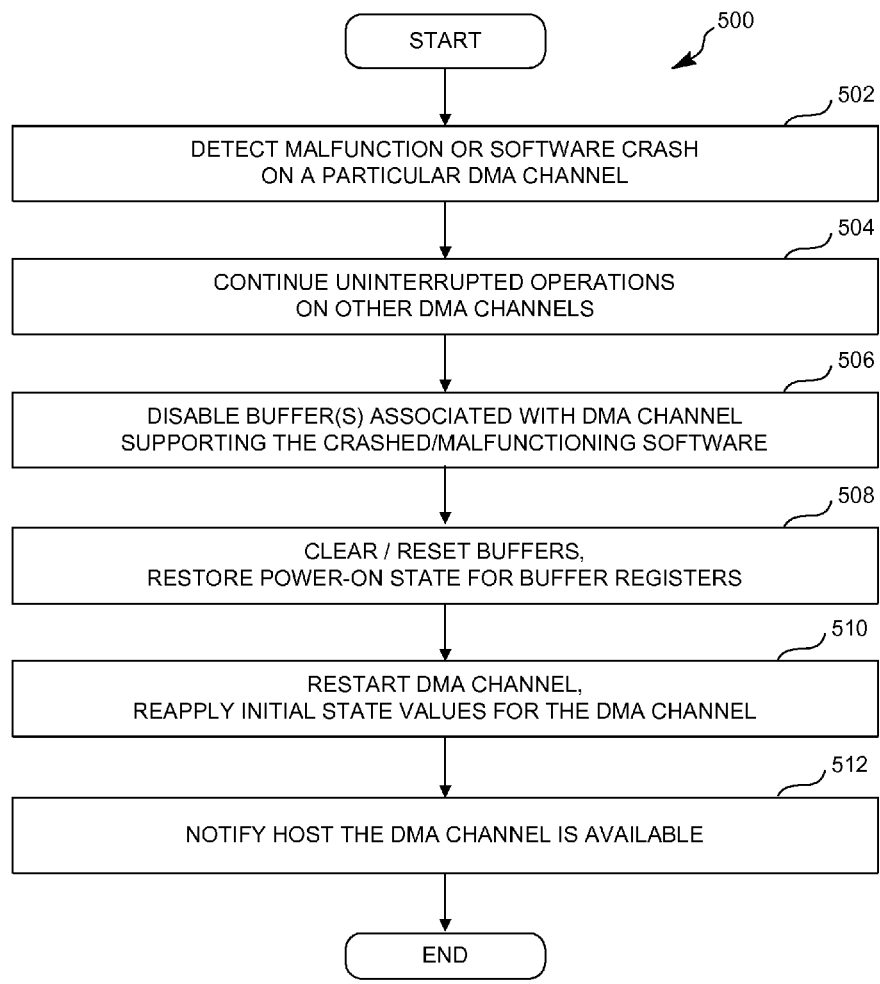
FIG. 5 is a flow chart for handling a malfunction or an unplanned/unexpected crash of an application or a software executing over a DMA channel that may be performed by the application delivery controller in FIGS. 2 and 3.

The operation of the example process for independently resetting DMA channels at the network interface controller 24 shown in FIGS. 4-5 will now be described with reference back to FIGS. 1A-3. The flowcharts 400 and 500 in FIGS. 4 and 5, respectively, are representative of example steps or actions that may be implemented as one or more computer or machine readable instructions stored on a computer readable medium that may be executed by the network interface controller 24 and/or host processor 20 shown in FIG. 1B to perform a process for independently resetting the DMA channels coherently and/or non-coherently, depending upon specific scenarios involving the executing applications. In this example, the machine readable instructions may embody an algorithm or computer program for execution by at least one of: (a) a one or more processors each having one or more processing cores that can be a part of host processor 20, or alternatively, independent from host processor 20, (b) hardware specially configured to perform the instructions (e.g., ASICs, FPGAs), and/or (c) one or more other suitable processing device(s) associated with network interface controller 24.

Example: DMA Coherent Restart

According to this example, software or applications executing on host processor 20 can be made to stop, re-program, and restart one or more of DMA channels supported by DMA engines 220. According to this example, host system 18 and network interface controller 24 monitor a plurality of applications communicating over a plurality of direct memory access (DMA) channels established across CPU bus 202. Referring now to FIG. 4, the process for independently resetting and restarting DMA channels begins in the application delivery controller 110 in step 404, where network interface controller 24 receives a request to restart a DMA channel from an application associated with the DMA channel. By way of example only, the reasons for the request can be associated with stopping and re-programming of one or more DMA channels, and/or reconfiguration of one or more application programs/software associated with the DMA channels. Further by way of example, the restart process can be initiated by enabling a "Restart Now" bit located in the DMA packet buffers 310.

In step 406, in response to the request for restarting, network interface controller 24 disables the DMA channel by disabling one or more buffers within DMA packet buffers 310 associated with the DMA channel that is requested to be restarted. By way of example only, the DMA packet buffers 310 and the packet buffer area can be disabled and other components of DMA memory resources 23 may not be disabled during the servicing of the request. Further by way of example only, during this time, the application delivery controller 110 can cease processing DMA operation requests from the requesting application relating to at least one of sending and fetching data packets. Similarly, the host processor 20 can be prevented from fetching for data associated with the application stored in DMA packet buffers 310 and/or packet buffers 256.

In step 408, pending in-flight DMA operation data associated with the application associated with the DMA channel requested to be restarted is processed. Other DMA channels are uninterrupted while the restart process is taking place. By way of example only, completing the pending operations on the DMA channel includes one or more of completing return frames, discarding subsequent return frames, and truncating any multi-descriptor frames that are in process in an active state memory buffer in DMA Packet buffers 310 over the DMA channel. According to one example, either of packet buffers 256 and DMA packet buffers 310, or both, can be used to store DMA operations prior to disabling the requesting applications.

In step 410, a determination is made if the one or more disabled buffers of step 406 (e.g., DMA packet buffers 310) is in an idle state. The determination can include, for example, monitoring an amount of time elapsing between DMA accesses by the application requesting restart of the DMA channel and determining that an amount of elapsed time has exceeded a maximum threshold. By way of example only, this determination can be made by reading a status bit in a register in a buffer in the DMA packet buffers 310. If the disabled buffer is not found to be idle, i.e., if the buffer is still active and storing in-flight DMA operation data, the flow proceeds to step 412 where the determination process waits for a preset amount of time and then checks again for a buffer idle state. The status bit is reset to indicate an idle state once all pending operations associated with the requested DMA channel are completed. Once an idle state is indicated by the disabled buffers, the flow proceeds to step 413 where the buffer is cleared to clear the DMA channel.

In step 414, after the clearing of the buffer in step 413, the process of restarting the DMA channel is initiated. Restarting process can include collecting information about how many buffers were associated with the DMA channel, clearing a state of the DMA channel by clearing one or more registers associated with the DMA channels that were holding DMA operation data, and removing all residual context in host memory 22 of host processor 20. Once these operations have been completed, CPU bus 202 is initialized and each of DMA channels is allocated one or more of a unique identifier, a buffer size, one or more host memory address locations and an application identification in the cleared registers. The restart process can involve, for example, choosing buffer size, loading start and end addresses for buffers in host memory 22 (e.g., DMA packet buffers 310), reapplying the initial state values for the DMA channels, and enabling programming of one or more of the DMA channels. Further by way of example only, the restart process can involve restoring a power-on state for one or more registers associated with the disabled DMA channel and restarting the DMA channel based upon the restored power-on state, the restarted DMA channel supporting the same application after restarting as it did prior to the receipt of the request.

In step 416, the host processor 20 is notified that the DMA channel is available again. For example, the host processor 20 can be updated about bit status of one or more buffers registers 1-4 of the packet buffers 256. Although only one buffer is being described in flowchart 400, it is to be noted that more than one buffer may be disabled depending on specific applications.

Example: DMA Non-Coherent Restart

In the event of a software crash or a malfunction of an application associated with DMA channels, or any other unexpected event involving the operation of one or more independently resettable DMA channels, a reboot of the malfunctioning software or application can be a possible solution. According to various aspects of the technology, the DMA channel and the DMA engine 220 associated with the crashed software or application will be in the state it was left in prior to the crash event. Once successfully rebooted, the malfunctioning application or software executes a non-coherent restart sequence to clear out the state of the DMA channel prior to the malfunction and re-initialize it. Referring to FIG. 5, steps for non-coherently restarting of one or more DMA channels are illustrated in flowchart 500.

In step 502, network interface controller 24 detects a malfunction or a crash of an application or software associated with a DMA channel. Such a detection can be based upon, for example, an unavailable application that stops accessing the DMA channel associated with it. According to an aspect of the technology, an example detection scheme may implement a "watchdog" software program executing on the network interface controller 24. While the software is operating prior to the malfunction, a watchdog timer logic associated with the watchdog program can be used to monitor an amount of time elapsing between DMA accesses by the software over the DMA channel and if the access time exceeds a threshold value, the watchdog timer logic may indicate the network interface controller 24 that a crash may have occurred.

In step 504, network interface controller 24 continues operation of other DMA channels while the DMA channel whose application has unexpectedly malfunctioned is being restarted.

In step 506, the restart process disables one or more buffers associated with the DMA channel. By way of example, the restart process can be initiated by enabling a "Restart Now" bit located in a buffer in the DMA packet buffers 310. Further by way of example, configuration registers in network interface controller 24 can be updated with information associated with the malfunction of the application and residual information from one or more buffers in host memory 22 that were accessed by the malfunctioning application are cleared.

In step 508, a power-on state for one or more registers in the buffers in DMA packet buffers 310 of host system memory 22 is restored. According to an aspect of the technology, the power-on state may be written for an entire set of registers associated with DMA channels which helps in creating a clean background information in the registers for the rebooted application or software. By way of example only, this restoring can clear the buffers to clear the affected DMA channel itself.

In step 510, the DMA channel is restarted based upon the restored state of the registers. The details of the restart process includes initialization in the same manner as for a DMA coherent restart scenario, as described above, and is not being repeated here.

In step 512, host processor 20 is notified about the availability of the DMA channel. For example, the host processor 20 is updated about the restart operation of the DMA channel so that normal operations can begin. Further by way of example, the host processor 20 can be updated about bit status of a buffer in the DMA packet buffer 310.

The steps shown in flowcharts 400 and 500 can be performed in part by components of application delivery controller 110 including network transceiver logic or network interface controller 24 and in part by host processor 20 with computer readable medium residing thereon. The computer readable medium can include instructions stored thereon for independently managing network applications within a network traffic management device, e.g., application delivery controller 110 communicating with networked clients and servers including machine executable code which when executed by one or more of processors (e.g., host processor 20), causes the one or more of processors to perform the steps outlined in flowcharts 400 and 500. Alternatively, either components of application delivery controller 110 including network transceiver logic or network interface controller 24 or host processor 20 with computer readable medium residing thereon may wholly perform the steps outlined in flowcharts 400 and 500. Further, the computer readable medium may execute instructions on both the application delivery controller 110 and a processor in an external server, depending on specific applications and implementations in which the various aspects of the present technology are used.

The examples described above provide a number of advantages. For example, the network interface controller 24 provides multiple independently resettable DMA channels to the host processor complex, e.g., host system 18, that can be configured without affecting other DMA channels' DMA operation. The constituent DMA channels of application delivery controller 110 share common resources (e.g., a Host Bus or CPU Bus 202) and each DMA channel can be independently reset and restarted without affecting the other DMA channels in device.

According to various examples, DMA channels can be stopped and started coherently by software without buffer loss or memory corruption. Such starts and stops permit graceful re-configuration of individual DMA channels as well as the attachment and detachment of software elements to the individual DMA channels. Alternatively, a sub-group of DMA channels from a group including a plurality of DMA channels may be independently serviced without disrupting the operation of other groups of DMA channels.

According to another advantage of the present technology, DMA channel activity can be stopped non-coherently. This scenario can occur when exception software steps in because the software driver/application has crashed. A non-coherent restart can, for example, have the exception software, with no knowledge to the DMA channel's state or configuration, be able to gracefully bring down the DMA channel and restore its initialization state. Once restored, the DMA channel is again made available to the system.

Other DMA channels within the network interface controller 24 are not affected by either coherent or non-coherent restarts of a single DMA channel. The unaffected channels continue to have uninterrupted access to CPU bus 202 and a bus interface and their internal state, data structures, and buffers are unaffected.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A method for independently managing network applications, the method comprising:

monitoring, by a network traffic management device, a plurality of applications, each one of the plurality of applications communicating over a respective one of a plurality of direct memory access (DMA) channels established across a bus;

disabling, by the network traffic management device, one DMA channel in the plurality of DMA channels in response to receiving an initial one of one or more sequential restart requests from one of the plurality of applications to restart the one DMA channel in the plurality of DMA channels, while allowing other executing applications in the plurality of applications to continue to communicate over other DMA channels in the plurality of DMA channels;

determining, by the network traffic management device, when an elapsed time starting from each of the one or more sequential restart requests exceeds a threshold time before receipt of another subsequent one of the one or more sequential restart requests;

clearing, by the network traffic management device, a state of the disabled DMA channel independently from the other DMA channels in the plurality of DMA channels when the determination indicates the elapsed time has exceeded the threshold time; and resuming, by the network traffic management device, communications for the one of the plurality of applications over the disabled DMA channel after the state of the disabled DMA channel is cleared.

2. The method as set forth in claim 1, wherein the disabling comprises maintaining a memory buffer in at least one of an active state while in-flight DMA operations are processed or an idle state when the in-flight DMA operations are completed or flushed from the memory buffer.

3. The method as set forth in claim 2, wherein the in-flight DMA operations comprise DMA operations stored in the memory buffer prior to disabling the first DMA channel.

4. The method as set forth in claim 1, wherein the disabling the DMA channel further comprises ceasing to process DMA operation requests from one of the plurality of applications relating to at least one of sending or fetching data packets.

5. The method as set forth in claim 1, wherein the resuming communications further comprises:
    restoring, by the network traffic management device a power-on state for one or more registers in the network device associated with the disabled DMA channel; and
    restarting, by the network traffic management device the DMA channel based upon the restored power-on state, the restarted DMA channel supporting the one of the plurality of applications after restarting.

6. The method as set forth in claim 1, wherein the resuming communications further comprises communicating to one or more host processors in the network device a status update associated with a restarting of the disabled DMA channel.

7. A non-transitory computer readable medium having stored thereon instructions for independently managing network applications comprising machine executable code which when executed by at least one processor, causes the processor to perform steps comprising:
    monitoring a plurality of applications, each one of the plurality of applications communicating over a respective one of a plurality of direct memory access (DMA) channels established across a bus;
    disabling one DMA channel in the plurality of DMA channels in response to receiving an initial one of one or more sequential restart requests from one of the plurality of applications to restart the one DMA channel in the plurality of DMA channels, while allowing other executing applications in the plurality of applications to continue to communicate over other DMA channels in the plurality of DMA channels;
    determining when an elapsed time starting from each of the one or more sequential restart requests exceeds a threshold time before receipt of another subsequent one of the one or more sequential restart requests;
    clearing a state of the disabled DMA channel independently from other DMA channels in the plurality of DMA channels when the determination indicates the elapsed time has exceeded the threshold time; and
    resuming communications for the one of the plurality of applications over the disabled first DMA channel after the state of the disabled first DMA channel is cleared.

8. The medium as set forth in claim 7, wherein the disabling comprises maintaining a memory buffer in at least one of an active state while in-flight DMA operations are processed or an idle state when the in-flight DMA operations are completed or flushed from the memory buffer.

9. The medium as set forth in claim 8, wherein the in-flight DMA operations comprise DMA operations stored in the memory buffer prior to disabling the DMA channel.

10. The medium as set forth in claim 7 wherein the disabling the DMA channel further comprises ceasing to process DMA operation requests from the one of the plurality of applications relating to at least one of sending or fetching data packets.

11. The medium as set forth in claim 7 wherein the resuming communications further comprises:
    restoring a power-on state for one or more registers associated with the disabled DMA channel; and
    restarting the DMA channel based upon the restored power-on state, the restarted DMA channel supporting the one of the plurality of applications after restarting.

12. The medium as set forth in claim 7, wherein the resuming communications further comprises communicating to one or more host processors in the network device a status update associated with a restarting of the disabled first DMA channel.

13. An application delivery controller apparatus comprising:
    at least one of configurable hardware logic configured to implement, a processor, or a network interface;
    a memory coupled to the processor and configured to be capable of executing programmed instructions comprising and stored in the memory to:
        monitor a plurality of applications, each of the plurality of applications communicating over a respective one of a plurality of direct memory access (DMA) channels established across a bus;
        disable one DMA channel in the plurality of DMA channels in response to receiving an initial one of one or more sequential restart requests from one of the plurality of applications to restart the one DMA channel in the plurality of DMA channels, while allowing other executing applications in the plurality of applications to continue to communicate over other DMA channels in the plurality of DMA channels;
        determine when an elapsed time starting from each of the one or more sequential restart requests exceeds a threshold time before receipt of another subsequent one of the one or more sequential restart requests;
        clear a state of the disabled DMA channel independently from other DMA channels in the plurality of DMA channels when the determination indicates the elapsed time has exceeded the threshold time; and
        resume communications for the one of the plurality of applications over the disabled DMA channel after the state of the disabled DMA channel is cleared.

14. The apparatus as set forth in claim 13, wherein the disabling comprises maintaining a memory buffer in at least one of an active state while in-flight DMA operations are processed or an idle state when the in-flight DMA operations are completed or flushed from the memory buffer.

15. The apparatus as set forth in claim 14, wherein the in-flight DMA operations comprise DMA operations stored in the memory buffer prior to disabling the DMA channel.

16. The apparatus as set forth in claim 13, wherein the disabling the DMA channel further comprises ceasing to process DMA operation requests from the one of the plurality of applications relating to at least one of sending or fetching data packets.

17. The apparatus as set forth in claim 13, wherein the resuming communications further comprises:
    restoring a power-on state for one or more registers in the network device associated with the disabled DMA channel; and
    restarting the DMA channel based upon the restored power-on state, the restarted DMA channel supporting the one of the plurality of applications after restarting.

18. The apparatus as set forth in claim 13, wherein the resuming communications further comprises communicating to one or more host processors in the network device a status update associated with a restarting of the disabled DMA channel.

* * * * *